(12) United States Patent
Grantz

(10) Patent No.: US 6,252,978 B1
(45) Date of Patent: Jun. 26, 2001

(54) DEVICE FOR PROTECTING A MOTOR VEHICLE AGAINST USE BY THIRD PARTIES, WITH INDIVIDUAL DRIVING AUTHORIZATION

(75) Inventor: Helmut Grantz, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/417,613

(22) Filed: Apr. 5, 1995

(30) Foreign Application Priority Data

Apr. 23, 1994 (DE) ................................................ 44 14 216

(51) Int. Cl.$^7$ ........................................................ G06K 9/00
(52) U.S. Cl. .......................... 382/118; 180/272; 180/287; 340/426; 701/1
(58) Field of Search .................................... 382/104, 117, 382/100, 118, 218, 305; 180/271, 272, 287; 364/424.01; 701/1, 2

(56) References Cited

U.S. PATENT DOCUMENTS

| | | | |
|---|---|---|---|
| 4,625,329 | 11/1986 | Ishikawa et al. | 382/100 |
| 5,008,946 | 4/1991 | Ando | 382/104 |
| 5,091,856 | * | 2/1992 | Hasegawa et al. | 180/287 |
| 5,335,748 | * | 8/1994 | Wilson | 180/287 |
| 5,408,536 | * | 4/1995 | Lemelson | 382/115 |
| 5,440,177 | * | 8/1995 | Bellin et al. | 180/287 |
| 5,513,107 | * | 4/1996 | Gormley | 180/287 |

FOREIGN PATENT DOCUMENTS

3514241A1  10/1986  (DE).
86/05018  8/1987  (WO).

OTHER PUBLICATIONS

Search Report from British Patent Office dated Jun. 8, 1995.
"Auf einen Blick", Schultz von Objekten, Funkschau, Jan. 1987, p. 34.
"Distortion Invariant Object Recognition in the Dynamic Link Architecture", Martin Lades et al., IEEE Transactions on Computers, vol. 42, No. 3, Mar. 1993.
"Fingeradruck wird zum Schlüssel", VDI Nachrichten No. 3, Jan. 22, 1993, p. 13.

* cited by examiner

Primary Examiner—Jay Patel
(74) Attorney, Agent, or Firm—Crowell & Moring, L.L.P.

(57) ABSTRACT

A device for protecting a vehicle against use by third parties provides an object detection system which detects the facial area of the driver and compares it, in an image analysis, with stored facial-area image information. For this purpose an image recording camera is positioned in the vehicle so that it automatically takes an image of the facial area when the driver is in position in the driver's seat. When the image recorded by the camera accords with the stored image information, a driving authorization signal is generated which actuates a plurality of vehicle systems to enter a state in which the vehicle can be started.

10 Claims, 1 Drawing Sheet

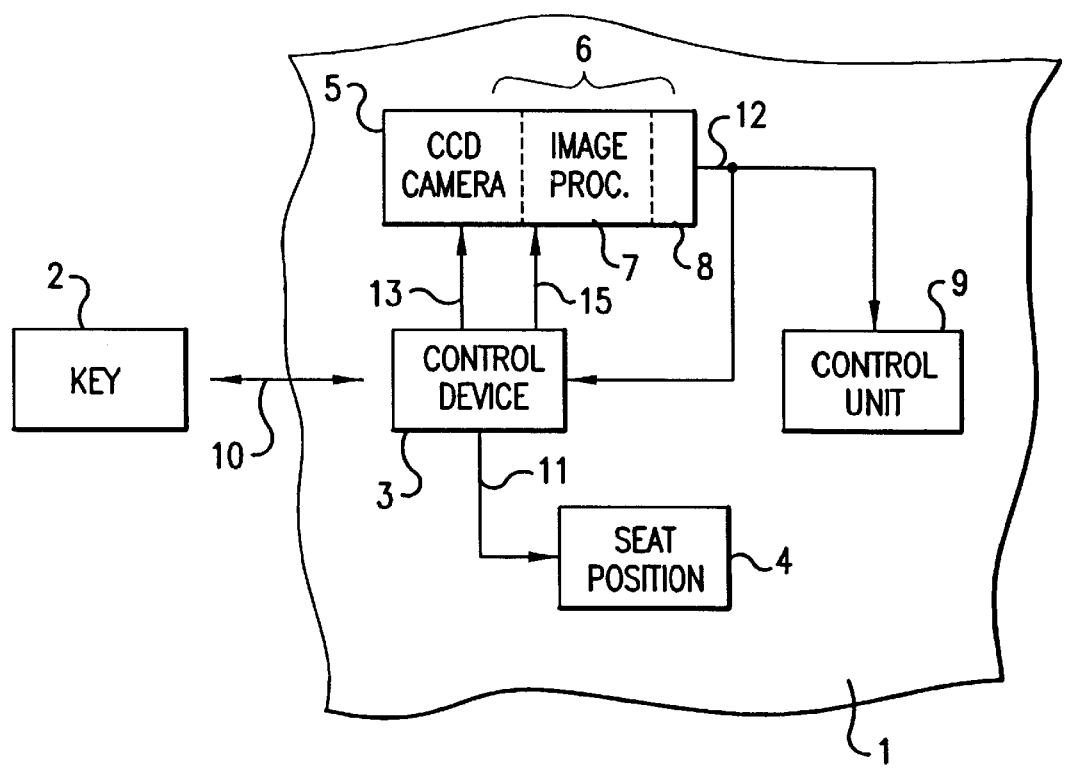

DEVICE FOR PROTECTING A MOTOR VEHICLE AGAINST USE BY THIRD PARTIES, WITH INDIVIDUAL DRIVING AUTHORIZATION

BACKGROUND AND SUMMARY OF THE INVENTION

The invention relates to a device for protecting a motor vehicle against unauthorized use by third parties, by means of a driving-authorization detection arrangement which takes person-specific features into account.

Devices which protect against unauthorized use by third parties and prevent vehicle starting are known, in which at least one piece of vehicle equipment required for driving is adjusted, when the vehicle is parked, to a state which disables the starting of the vehicle. The disabled state can be cancelled by means of a vehicle authorization signal that can be triggered only by means of a code signal of an authorizing, user-end key unit. Such disabling arrangements suffer, however, from the problem that an unauthorized person can forcibly gain authorization by stealing the authorizing key unit or threatening the authorized person to reveal the authorizing code. Devices for protecting against use by third parties of the type mentioned at the beginning attempt to overcome this problem by closely associating the driving authorization criterion with the identity of the authorized person.

Such a device for protecting against use by third parties is described in the German Patent Document DE-OS 35 14 241 A1, in which an image of a grooved area of the driver's skin (in particular a finger tip), is recorded using a video camera. For this purpose, the camera is focused onto the surface of an exterior viewing screen, and the area of skin is placed on the screen and illuminated from the camera side when the image is recorded. The information on the grooved skin structure thus obtained is compared in an identification unit with an item of stored desired grooved skin structure information. If correspondence is detected a driving authorization signal is generated which actuates a disabling circuit that otherwise disables a piece of equipment required to operate the vehicle (for example, steering lock, ignition or fuel supply unit). The execution of a detection process is required for each subsequent successful start of the vehicle. In order to increase security against manipulation in the case of an attempt to bring about a successful detection process by using a photograph of the respective skin area of the authorized user, there is provision for an image to be recorded under different lighting conditions and for evaluation of the shadow structures which vary in such a case.

However, the security of this system is limited in that an unauthorized person can obtain unlimited future driving authorization by, for example, forcing the authorized person to provide him with a copy of the respective skin groove structure with which he can make a plastic copy to be used subsequently to achieve driving authorization. Additionally, this system requires additional action on the part of the driver before the vehicle starts in the form of the positioning of the skin area on the viewing screen, which makes the starting process less convenient.

To identify a specific person, in addition to taking finger prints, it is also known to compare an image of the eye (for example, of the iris and pupil area or of the area of the cornea), and compare it with corresponding stored image information. For this purpose, the person to be tested has to look into a scanning device such as provided, for example, in the laid-open publication WO 86/05018 or the magazine article "Aufeinen Blick [with one look]" in Funkschau 1/1987, page 34. Yet another identification arrangement compares an image of a facial area which is compared with stored image information by means of an image processing unit on the basis of a neuronal network. This arrangement can identify an individual even in the case of slightly changed image information, for example as a result of a slightly different posture of the head, changed hairstyle or different facial expression. See the newspaper report "Fingerabdruck wird zum Schlüfssel [finger prints become the key]" in VDI Nachrichten No. 3, 22.01.1993, page 13, and the article "Distortion Invariant Object Recognition in the Dynamic Link Architecture" by M. Lades et al. in IEEE, TRANS. ON COMP., Vol. 42, No. 3, March 1993, page 300.

U.S. Pat. No. 4,625,329 discloses a device for detecting the position of a vehicle driver, in which the face of the driver is illuminated and the light reflected back from it is received and evaluated in order to determine the three-dimensional position of the driver. The purpose of this device is to automatically adjust to the particular driver, certain adjustable vehicle elements, such as the rearview mirror, air vents etc. Thus, in this publication, only the position of the facial area of the driver is monitored in space, without object-detecting image analysis of the facial area.

An object of the present invention is to provide a device for protecting a vehicle against use by third parties, which permits reliable detection of an authorized driver, is comparatively manipulation-proof and is convenient.

This problem is solved according to the invention, by means of a device which utilizes image analysis of an area of the face for driving authorization detection. Such image analysis of facial features is sufficiently functionally reliable for this purpose, given the currently available object detection systems which are neuronal networks, since the image processing of such an object detection system is capable of recognizing the area of the face even in the case of a somewhat changed external appearance (for example changed posture of the head, different glasses and different facial expression), and is also capable of reliably distinguishing the area of a face from corresponding areas of faces of other persons. In particular, it is expedient to include the region of the eyes, nose and mouth in the analyzed area of the face.

The high selectivity of such a facial area detection system provides at the same time a high degree of protection against manipulation, since it is virtually impossible for an unauthorized person to produce a satisfactory copy of an authorizing area of a face. Additionally, the device is extremely convenient, since the suitable positioning of the camera which records the images eliminates the need for any actions on the part of the driver in order to verify driving authorization. Instead, the detection process proceeds completely automatically, without the driver having to devote his attention to it detection at all. That is, the driver can activate the vehicle and keep it operating, without being disturbed by the detection of driving authorization.

Parallel to the detection of driving authorization by image analysis of an area of a driver's face, further conventional security devices may also be provided within the entire system of the device for protecting against use by third parties. In particular systems may be provided for detecting access authorization, such as a mechanical and/or an electronic key with electronic access authorization coding.

One embodiment of the invention further increases security against manipulation by detecting the thermal radiation of the facial area, so that, for example, even an externally identical mask copy of the authorizing facial area does not lead to a driving authorization signal being generated.

Increased security against manipulation is also offered by another embodiment of the invention in which, when an authorized driver is actually seated at the steering wheel of the vehicle while driving it, the images of the facial area are successively recorded. Such images are never completely identical because of the different posture of the head and facial expression, and the vehicle, in this case, is not disabled. If, on the other hand, an unauthorized person attempts to feed manipulated image information into the image processing unit, the device is able to recognize this image information which is present in unchanged form, as manipulated input information and, in response, to disable the vehicle to prevent further use. Moreover, since it is not absolutely necessary in this case to detect driving authorization before an attempt to start the vehicle, it may be possible, if appropriate, to save on computational outlay. of course, it is possible by means of further measures to ensure that other kinds of manipulation attempts carried out on the camera or on the evaluation system also lead to subsequent deactivation of the vehicle. It is also possible to preclude restarting of the vehicle until the system has been reprogrammed with original image information.

In another embodiment of the invention a sitting position is preprogrammed for the driver so that his or her facial area can be reliably positioned in the spatial area detected by the video camera before a detection process is carried out, without the driver having to concern himself with this requirement. After detection of driving authorization, he may then, if appropriate, perform further seat adjustment. Preferably, the system stores the seat position when the vehicle is parked as a desired position for the next time this user enters the vehicle. At the same time, if the image recording camera is movable, the position of the camera can also be stored and matched to the facial area, making the facial-area detection process in the image processing unit easier since serious longitudinal and transverse deviations of the position of the facial area during the recording of the images do not occur. Therefore, in vehicles with mechanical seat adjustment, the detection system may require a somewhat larger computational outlay in order to determine the position of the facial area. If necessary, when the seat adjustment is mechanical, a measure which increases driving safety, consisting in moving the driver into a suitable seat position before the vehicle starts, can be associated with the detection of driving authorization.

Still another embodiment of the invention prevents manipulation of the signal line between the camera and image processing unit by entering manipulated image information in place of actual image information into the image processing unit, in the same way as such information could be acquired for example by using a video image of an authorized person.

Further embodiments of the invention relate to coding measures for increased protection of the data flow for detecting driving authorization by means of optical testing of the facial area. Thus, storing the desired image information in a unit in the vehicle, it may be stored in a code-protected way in an electronic key unit carried by the user, so that the said information is not present in the vehicle and cannot be read out of the vehicle in an unauthorized way, even if the vehicle is stolen. Also, reading out the stored image information from a key unit prevents an unauthorized person's gaining access to the system without knowledge of the code used for storage.

The transmission of the desired image information into the image processing unit during activation of a facial-area detection process can also be performed in a code-protected way. For this purpose the same procedures can be applied as are used to transmit, from a key unit to the vehicle, code information which authorizes access or deactivates an immobilizer. In particular, the algorithm for decoding the code for the storage of desired image information may be stored in coded form in the key unit, and activated in response to a request from the vehicle by means of bidirectional exchange of data so that secret information does not need to be stored in the vehicle. If the decoding requires a significant amount of power, mechanical contact may be provided between the key unit and the power supply of the vehicle. Of course, a possible alternative is to store the algorithm in the vehicle, in particular integrated in the image processing unit.

In order to increase security further, an acknowledgement exchange method may be provided to prevent unauthorized reading out of the information at the key end. In this embodiment it is determined initially, by reference to a vehicle-specific code which is also stored in the key unit, whether the combination of key unit and vehicle is acceptable, and the actual exchange of code data relating to detection of driving authorization and possibly detection of prior access authorization, does not take place until this has occurred.

A further advantageous embodiment protects the transmission path of the driving authorization signal (which is generated in the image processing unit when correspondence of images is detected) to respective pieces of vehicle equipment, in order to prevent the direct entry of a manipulated signal to actuate these pieces of vehicle equipment to change into a state which permits starting of the vehicle. If, in this way, a plurality of pieces of equipment (for example, all the relevant control devices of the vehicle's electrical system), are protected against unauthorized enabling, it would be necessary to replace all of them in order to bypass the device for protecting against use by third parties. Consequently, the pieces of equipment can be selected such that the required outlay is no longer in reasonable proportion to the benefit which can potentially be achieved by a theft, and theft thus is unattractive.

In still another embodiment of the invention, after a successful detection of driving authorization, it is possible for the vehicle to continue to be used for a prescribed number of operating phases, even by persons for which no authorizing facial area information is stored. No further enabling signal is then produced until after this prescribed number of operating phases if the vehicle is not in the meantime, or subsequently, used again by an authorized driver. The intention of this measure is to permit the vehicle to be used temporarily even by persons other than those stored as authorized, which is desired for example for occasions when the vehicle is lent out, visits to garages and hire cars.

Another embodiment of the invention enables an authorized driver also to use the vehicle with other acceptable key units despite the facial area information being stored in the key, for occasions for example when he has lost a key unit.

In a final embodiment of the invention the detection security can be increased. At the same time, attempts at manipulation are made more difficult.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of a device for protecting against unauthorized use by third parties of a motor vehicle, by means of individual driving authorization.

DETAILED DESCRIPTION OF THE DRAWING

In the FIGURE only elements which are essential to protect against use by third parties are shown. At the user end these are a plurality of electronic key units (2) (only one being shown for the purpose of illustration) with a mechanical ignition lock-actuating component. In each key unit (2) there is stored, inter alia, vehicle-specific code information, coded access authorization information and coded user-specific desired facial area information. In the vehicle (1), which is indicated only schematically, the apparatus comprises a control device (3) which, in addition to protecting against use by third parties, fulfills further operating functions for the vehicle (1) which are not essential here, a vehicle-seat positioning unit (4) which can be actuated by the control device (3), and an object detection system (6) which includes in a single component a CCD camera (5), an image processing unit (7) arranged downstream and a coder (8) arranged farther downstream. A plurality of vehicle control units (9) relevant to driving (only one being shown for simplicity of illustration) are connected to an output of the image detection system. The latter may include, in particular, the control devices of the vehicle's electrical system.

The control device (3) communicates via a bidirectional data transmission link (10) with the key units (2). In addition to an actuation line (11) for the driver's seat positioning unit (4), an activation line (13) connects the control device (3) to the CCD camera (5), and a code-protected line (15) leads to the image processing unit (7), in particular for the transmission of desired facial area information transmitted from a key unit (2). Via a further code-protected line the object detection system (6) transmits to the control units (9) a coded enabling signal (12) which changes the control units (9) to a state in which the starting of the vehicle is enabled. If, on the other hand, the enabling signal (12) is not present, the control units (9) are in a state which disables the starting of the vehicle.

In the key units (2), in addition to code information required for testing access authorization as part of the device for protecting against use by third parties, the facial area image information specific for a particular user is stored in a nonerasable memory. This information has been acquired by means of a single recording when the vehicle was bought, and fed in by an authorized person. Of course, the key units may alternatively also be part of a so-called keyless entry system, or, if the desired facial area information is alternatively stored in the vehicle, they may be realized as simple mechanical keys.

The mode of operation of the device for protecting against use by third parties shown is explained in greater detail below with reference to an attempt at starting a vehicle. The vehicle control units (9) involved are initially in a state such that the starting of the vehicle is disabled, and have been so since the vehicle (1) was last parked.

First, access authorization is tested by means of code information which is stored at the key end and can be transmitted to the vehicle end via the bidirectional data transmission channel (10) which is illustrated in schematic form. This access authorization coding by means of a bidirectional code method as part of the device for protecting against use by third parties is realized in a conventional manner, and therefore is only of interest in the present case to the extent that successful testing of access authorization is a precondition for the detection of driving authorization described below. In particular, it is determined at the beginning during the testing of access authorization, using a vehicle-specific code which is stored at the key end, whether a key unit (2) which intended for this vehicle (1) in fact has a data exchanging connection with the said vehicle (1). Furthermore, as part of this code information a code component specific for the user is transmitted, which causes the control device (3) to actuate the unit (4) to position the driver's seat via the control line (11) in such a way that the driver's seat assumes a position which is stored for this user.

If the process of testing access authorization is concluded successfully, the user can open the vehicle and assume his position in the driver's seat. While he starts the vehicle by inserting the key unit (2) into the ignition lock, the control device (3) (triggered by the insertion of the key unit (2) into the ignition lock), transmits an activation signal (13) to the CCD camera (5) of the object detection system (6). The control device (3) also begins a bidirectional exchange of code data with the key unit (2) to feed the desired image information stored there in coded form to the image processing unit (7) via the control device (3) and the code-protected, manipulation-proof transmission line (15), using a decoding algorithm which is also stored in the key unit (2) in coded form. The transmission path (15) is protected against tampering by virtue of the integral design of the object detection system (6) with the integrated mounting of the camera (5) and image processing unit (7).

The image processing unit (7) receives the actual image information from the CCD camera (5), and compares it with the corresponding facial area image information which is stored in the key unit (2) for driver in question, by means of the abovementioned, known facial area-detecting image processing system using a neuronal network. The method carried out by this system is divided roughly into the steps of i) generating a grid in the form of a rectangular network structure which is placed over the image, moved to the position of the face, and adjusted in terms of scale to the size of the face; ii) filtering; and iii) actual comparison with the stored image information according to a so-called metropolis algorithm which permits a facial area to be recognized again unambiguously, despite changes resulting from a changed facial expression or turning of the head.

If the image processing unit (7) detects correspondence between the actual facial area information and the desired facial area information, the image processing unit (7) produces a driving authorization signal which is coded in the coder (8) that is integrated in the object detection system (6), and transmitted as a coded enabling signal (12) to the control units (9) involved. The code-protected transmission of the enabling signal (12) from the object detection system (6) to the control units (9) involved is realized in a conventional procedure such as is customary for example for transmitting access-authorizing user code information between the key end and vehicle end so that this transmission does not need to be described in any greater detail here. Consequently, the control units (9) change from their vehicle start disabling state into their enabling state, so that the vehicle (1) can now be started in the customary manner. It is to be noted in this regard that the detection of driving authorization described above using detection of facial areas takes place so quickly that an authorized driver does not perceive any delay in the starting process.

So that the vehicle (1) can also be used for a limited time period by other persons, who do not have assigned to them an authorizing key unit (2) with stored facial area information, the following enabling facility is provided in the control device (3). In this case the control device (3) senses successful detection of a facial area (for which purpose the coded enabling signal (12) is also fed to it), and counts the respective phases of the driving operation taking place after this and compares this number with a stored limit value. As long as this limit value has not been reached, after a successful detection of access authorization, the control device (3) transmits an enabling activation signal to the image processing unit (6) via the line (15), which causes the image processing unit to transmit the enabling signal (12), irrespective of a detection of a facial area, to the vehicle control units (9) involved. The latter thus change to their enabling state, so that the vehicle can be started. The enabling activation signal is not produced and the vehicle control units (9) remain in their disabling state until this limit value is reached, after which the vehicle can be started again only by a person who demonstrates that he is authorized by means of a facial area detection, in that the code-protected enabling signal (12) which is then generated from a successful detection of a facial area, is transferred to the control units (9) and decoded there. The control units (9) then assume their enabling state again, which permits persons other than those actually authorized to use the vehicle for a limited period of time. This is appropriate, for example, for visits to garages, occasions when the vehicle is being lent out and hire cars.

The invention has further advantageous secondary effects. For example, an image of the driver which can serve as proof in the event of possible unauthorized use of the vehicle, is stored automatically. As a result of individualizing the driving authorization, adjustments to the vehicle which are to be performed in a user-specific way, such as for example adjustments to the mirrors and air vents, can be combined with the detection of the facial area. The camera can at the same time also be used for a videophone function in conjunction with future telephone systems. Furthermore, by means of a conventional algorithm, the blinking frequency of the eyes can also be monitored, and used to warn against falling asleep at the wheel.

Of course, a plurality of different modifications of the embodiment described above within the scope of the invention can be realized by a person skilled in the art. Thus, for example instead of the described detection of a facial area each time before a vehicle is started, there may be provision for such detection of driving authorization to be performed at prescribed time intervals or, for the sake of increased security against manipulation, at randomly distributed time intervals, while the vehicle is being driven, and not necessarily before starting a vehicle; this measure reduces the computational outlay in the central control unit. Furthermore, with repeated detection of a facial area it is possible to test whether the identical actual information is continuously supplied to the image processing unit during a journey, which is a clear indication of manipulation (since the images of the face of a driver which are successively recorded during a journey are never completely identical). In the latter case, it would be possible to provide for the control units to be disabled in a way which would completely immobilize the vehicle when the ignition is subsequently switched off.

In addition to the described method of image processing, other pattern-detecting or object-detecting methods for realizing the object detection system are also possible, for example methods which operate on a fuzzy logic basis. Moreover, it is possible to permit a specific number of verifying repetition attempts within a facial area detection process in order to ensure an unambiguous detection of driving authorization. If the recording of images is disturbed by the different lighting conditions present in the vehicle, this can be overcome by means of an independent lighting system in the short infrared range.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for protecting a motor vehicle against use by third parties comprising:

at least one vehicle component whose operation is necessary to drive said vehicle, which vehicle component can be adjusted by means of a driving authorization signal, from a disabled state in which the starting of the vehicle is disabled, into an enabling state in which the starting of the vehicle is enabled; and a memory containing desired image information comprising facial area image information for persons authorized to operate the motor vehicle;

an image comparison system for detecting facial features of the driver by means of an image recording camera, comparing the acquired image information with the stored desired image information, for generating a driving authorization signal only when correspondence is detected; wherein the sensed part of the body is a facial area of the driver;

the image comparison system is an object detection system comprising an image recording camera having an output thereof connected to an image processing unit for an object-detecting comparison of image information;

the image recording camera is positioned in the vehicle directed at a facial area of the driver when the latter is in position in the driver's seat;

detection of facial areas of a driver is carried out at time intervals when the vehicle is being driven;

the object-detecting image processing unit compares the successively input items of actual image information with one another; and the object detection system interrupts generation of the driving authorization signal when there is complete correspondence between said successively input items of actual image information.

2. Device for protecting a motor vehicle against use by third parties comprising:

at least one vehicle component whose operation is necessary to drive said vehicle, which vehicle component can be adjusted by means of a driving authorization signal, from a disabled state in which the starting of the vehicle is disabled, into an enabling state in which the starting of the vehicle is enabled;

a memory containing desired image information comprising facial area image information for persons authorized to operate the motor vehicle;

an image comparison system for detecting facial features of the driver by means of an image recording camera, comparing the acquired image information with the stored desired image information, for generating a driving authorization signal only when correspondence is detected; wherein the sensed part of the body is a facial area of the driver;

the image comparison system is an object detection system comprising an image recording camera having an output thereof connected to an image processing unit for an object-detecting comparison of image information;

the image recording camera is positioned in the vehicle directed at a facial area of the driver when the latter is in position in the driver's seat; and desired image information is stored in coded form in a user-end key unit.

3. Device for protecting a motor vehicle against use by third parties according to claim 2 wherein the image recording camera is a CCD camera which also senses thermal radiation from the facial area, and passes it on as image information.

4. Device for protecting a motor vehicle against use by third parties according to claim 1 further comprising:

a seat position unit for positioning the driver's seat in a driver-specific way; and a control unit which detects driver identity based on testing access authorization, and controls said seat position unit to set a user specific position of the driver's seat which has been previously stored; wherein a process of detecting facial areas of drivers is carried out after each setting of a driver specific position of a driver's seat.

5. Device for protecting a motor vehicle against use by third parties according to claim 2 wherein the image recording camera and the object-detecting image processing unit form integrated components of a module having a signal path between the camera and image processing unit which is protected against tampering.

6. Device for protecting a motor vehicle against use by third parties according to claim 2 wherein an algorithm for decoding the desired image information is stored in coded form in the key unit, and can be activated only by vehicle-end request within a bidirectional exchange of authorization code data between the key unit and the vehicle.

7. Device for protecting a motor vehicle against use by third parties according to claim 6 further comprising:

means are provided in the vehicle and the key unit for testing the presence of an acceptable key unit/vehicle combination by testing vehicle-specific code information stored at the key end; wherein an exchange of data between the vehicle and the key unit which goes beyond the testing of an acceptable key unit/vehicle combination is disabled as long as no acceptable key unit/vehicle combination is detected.

8. Device for protecting a motor vehicle against use by third parties according to claim 2 wherein the object detection system transmits the driving authorization signal in code-protected form to a plurality of pieces of vehicle equipment which are necessary to drive the vehicle, and which are each equipped with a decoder unit.

9. Device for protecting a motor vehicle against use by third parties according to claim 2 wherein a plurality of items of facial-area image information, which are part of images recorded with a different posture of the head and/or different lighting, of each person authorized to use the vehicle are stored as desired image information.

10. Device for protecting a motor vehicle against use by third parties comprising:

at least one vehicle component whose operation is necessary to drive said vehicle, which vehicle component can be adjusted by means of a driving authorization signal, from a disabled state in which the starting of the vehicle is disabled, into an enabling state in which the starting of the vehicle is enabled;

a memory containing desired image information comprising facial area image information for persons authorized to operate the motor vehicle;

an image comparison system for detecting facial features of the driver by means of an image recording camera, comparing the acquired image information with the stored desired image information, for generating a driving authorization signal only when correspondence is detected; wherein the sensed part of the body is a facial area of the driver;

the image comparison system is an object detection system comprising an image recording camera having an output thereof connected to an image processing unit for an object-detecting comparison of image information;

the image recording camera is positioned in the vehicle directed at a facial area of the driver when the latter is in position in the driver's seat; and at least one component continues to be kept, in each case for a prescribed plurality of subsequent vehicle starts, in its enabling state after each occasion when correspondence is detected during a process of detection of the facial area of the driver.

\* \* \* \* \*